Patented July 28, 1942

2,291,526

UNITED STATES PATENT OFFICE 2,291,526

HALOMETHYL ETHER KETONES

Herman A. Bruson and Clinton W. MacMullen, Philadelphia, Pa., assignors to Röhm & Haas Company, Philadelphia, Pa., a corporation of Delaware No Drawing. Application October 15, 1941, Serial No. 415,034

8 Claims. (Cl. 260—590)

This invention relates to ethers which contain at least one aromatic nucleus which has one or more halomethyl groups attached directly to a carbon atom of the ring. It relates further to a process for preparing these ethers. More particularly it relates to the preparation of nuclear halomethyl substituted aromatic ethers having the general formula:

(hal—CH$_2$)$_n$—R—X—A—Y wherein hal is a member of the group consisting of chlorine and bromine, n is an integer less than three, R is a carbocyclic aromatic radical, X is a member of the group consisting of O and S, A is an alkylene group, the chain of which may be interrupted by a member of the group consisting of O and S, and Y is a member of the group consisting of —OH, —O—alkyl, —O—aryl, —OCO—alkyl, —OCO—aryl, —CO—alkyl, —CO—aryl, —COO—alkyl, —COOH, and —CH$_2$hal.

These halomethyl compounds may be prepared by condensing an ether of the general formula R—X—A—Y with formaldehyde and hydrogen chloride or hydrogen bromide. The reaction takes place readily in concentrated hydrochloric or hydrobromic acid solution at temperatures of about 10–60° C. without splitting the ether linkages. The compounds thus obtained may be used in the preparation of wetting agents, resins, insecticides, mothproofing agents, tanning materials, and other industrial products.

Typical ethers which are suitable for the preparation of these new halomethyl compounds are the following:

R—O—CH$_2$CH$_2$Cl
R—S—CH$_2$CH$_2$Cl
R—O—CH$_2$CH$_2$—O—R
R—S—CH$_2$CH$_2$—S—R
R—O—CH$_2$CH$_2$—OH
R—O—CH$_2$COOH
R—O—CH$_2$COO—alkyl (C$_1$ to C$_{18}$)
R—O—CH$_2$CH$_2$—O—CO—alkyl (C$_1$ to C$_{17}$)
R—O—CH$_2$COR'
R—O—CH$_2$COCH$_3$
R—O—CH$_2$COC$_6$H$_5$
R—O—(CH$_2$)$_n$—COR'
R—O—CH$_2$CH$_2$COCH$_3$
R—O—CH(C$_8$H$_{17}$)(CH$_2$)$_8$COCH$_3$
R—O—CH(C$_2$H$_5$)COCH$_3$ and compounds containing the radical

R—O—A— in which A is a polyalkylene ether group, such as:

R—O—CH$_2$CH$_2$—O—CH$_2$CH$_2$—O—R
R—O—CH$_2$CH$_2$—S—CH$_2$CH$_2$Cl
R—O—CH$_2$CH$_2$—O—CH$_2$CH$_2$Cl
R—O—CH$_2$CH$_2$—S—CH$_2$CH$_2$—O—R
R—O—CH$_2$CH$_2$—O—CH$_2$CH$_2$COR'
R—O—CH$_2$CH$_2$—O—CH$_2$CH$_2$COC$_3$H$_7$
R—O—CH$_2$CH$_2$—O—CH$_2$CH$_2$COC$_6$H$_4$CH$_3$
R—O—CH$_2$CH$_2$—O—CH$_2$CH$_2$—O—CH$_2$CH$_2$Cl
R—O—CH$_2$CH$_2$—O—CH$_2$CH$_2$—O—alkyl
(C$_1$ to C$_{18}$)
R—(O—CH$_2$CH$_2$)$_y$—OH;
where $y = 1$ to 10 inclusive
R—(O—CH$_2$CH$_2$)$_y$—O—alkyl
R—O—CH$_2$CH$_2$—O—CH$_2$CH$_2$—
                            O—CH$_2$CH$_2$—O—R
R—O—CH$_2$CH$_2$—O—CH$_2$CH$_2$—O—COR'
(R' being alkyl or aryl)

in which R is an aromatic residue, which may contain other nuclear substituents such as alkyl, aralkyl, cycloalkyl, aryl, nitro, halogen, acyl groups, etc. but must be free of radicals or groups which are destroyed by the hydrogen halide or the formaldehyde. Such groups are, for example, the amino, diazo, and aldehyde groups. It must also be free of hydroxyl groups which would cause condensation of the formaldehyde in a different manner. These aromatic radicals must have at least one replaceable nuclear hydrogen atom and, in case more than one is available, more than one (hal—CH$_2$)— group can be introduced into the aromatic radical. The aromatic radical may be mononuclear or polynuclear such as a benzene, naphthalene, phenanthrene, anthracene, or other polynuclear radical.

The reaction is carried out in general by suspending the aryl ether in the aqueous hydrohalogen acid containing the formaldehyde and passing in dry hydrogen halide at temperatures of about 10 to 60° C. The aryl ether may also be dissolved in a suitable non-reactive organic solvent such as petroleum ether, ethylene dichloride, etc. The formaldehyde may be used in the form of an aqueous solution or as paraformaldehyde. The products obtained are usually low-melting solids or thick oils.

This invention may be illustrated by the following examples. It is not limited, however, to the exact conditions of time, temperature, and reagents shown as it may be otherwise practiced within the scope of the appended claims.

*Example 1*

A stream of dry hydrogen chloride was passed into a mixture of 100 g. of phenoxyethoxyethyl chloride, 102 g. of 37% formaldehyde, and 300 cc. of concentrated hydrochloric acid for eight hours at a temperature of about 30° C., the reaction mass being stirred throughout this period. A light brown oil formed which was separated, dissolved in benzene and washed with ice water. The benzene solution was dried with anhydrous sodium sulfate, filtered, and the solvent evaporated in vacuo, leaving 116 g. of oil which on cooling changed to a white solid. This material was purified by distillation in vacuo. It boiled at 210–215° C./5 mm. and the distillate solidified to a crystalline mass which on recrystallization from petroleum ether was obtained in the form of white crystals having a melting point of 52–54° C. The determination of chlorine content showed it to be di(chloromethyl) phenoxyethoxyethyl chloride having the probable formula:

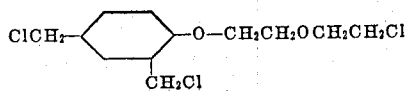

*Example 2*

A mixture of 156 grams of phenoxyethyl chloride, 500 grams of 30% formaldehyde, and 500 cc. of concentrated hydrochloric acid was heated at 45–55° C. and stirred vigorously while a stream of dry hydrogen chloride was passed in for eight hours. The semi-solid material was purified by washing with cold methyl alcohol. The white crystalline solid obtained, having a melting point of 60–62° C., was di(chloromethyl) phenoxyethyl chloride having the probable formula:

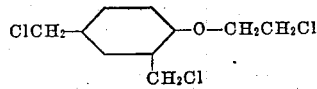

*Example 3*

A mixture of 122 grams of phenoxyethoxyethyl chloride, 102 grams of 37% formaldehyde, and 300 cc. of concentrated hydrochloride acid was stirred vigorously and a stream of dry hydrogen chloride was passed into the mixture for eight hours at 30–33° C. A light brown oil separated which was dissolved in benzene, washed with ice water, the solution dried with anhydrous sodium sulfate, filtered, and the benzene evaporated in vacuo. The residue was a clear, light brown oil weighing 136 grams. A chlorine determination showed this to be di(chloromethyl) phenoxyethoxyethoxyethyl chloride having the formula:
(ClCH$_2$)$_2$-C$_6$H$_3$-O-CH$_2$CH$_2$-O-
CH$_2$CH$_2$-O-CH$_2$CH$_2$Cl

*Example 4*

A mixture of 44 grams of β-chloroethoxyethyl phenyl sulfide ClC$_2$H$_4$O-C$_2$H$_4$S-C$_6$H$_5$, 65 grams of 37% formaldehyde, and 200 cc. of concentrated hydrochloric acid was heated at 50–60° C. and stirred vigorously while a stream of dry hydrogen chloride was passed through the mixture for ten hours. A brown oil layer separated which was dissolved in benzene, washed, dried, and the solvent removed in vacuo. 50 grams of a clear, brown oil remained, which was chloromethylphenyl β-chloroethoxyethyl sulfide having the formula:
Cl-CH$_2$C$_6$H$_4$S-C$_2$H$_4$O-C$_2$H$_4$Cl

*Example 5*

A mixture of 118 g. of o-chlorophenoxyethoxyethyl chloride, 90 g. of 37% formaldehyde, and 300 cc. of concentrated hydrochloric acid was heated at 50–60° C. and stirred vigorously while a stream of dry hydrogen chloride was passed through the mixture for 18 hours. A brown oil separated which was washed and dried as described above. On evaporation of the solvent a clear, light brown oil weighing 126 g. remained. This was chloromethyl o-chlorophenoxyethoxyethyl chloride having the probable formula:

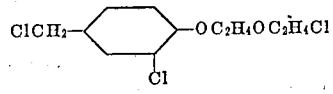

*Example 6*

A mixture of 131 g. of o-sec-octyl phenoxyethoxyethoxyethyl chloride, 60 g. of 37% formaldehyde, and 300 cc. of concentrated hydrochloric acid was heated at 50–60° C. while a stream of dry hydrogen chloride passed in for about 20 hours. The product was isolated as described above. The light brown oil was o-sec-octyl chloromethyl phenoxyethoxyethoxyethyl chloride having the formula:

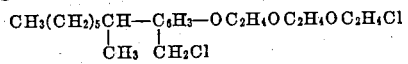

In a similar manner dodecyl phenoxyethoxyethyl chloride was converted to its chloromethyl derivative which is a pale yellow oil.

*Example 7*

A mixture of 160 g. of p-phenyl phenoxyethoxyethoxyethyl chloride, 142 g. of 37% formaldehyde, and 300 cc. of concentrated hydrochloric acid was heated at 50–60° C. and stirred while a stream of dry hydrogen chloride was passed in for ten hours. 151 g. of a dark brown oil was isolated in the usual manner. This product was chloromethyl p-phenyl phenoxyethoxyethoxyethyl chloride.

*Example 8*

81.6 g. of p-cyclohexyl phenoxyethoxyethoxyethyl chloride, 41 g. of 37% formaldehyde, and 200 cc. of concentrated hydrochloric acid were heated at 50–60° C. and a stream of dry hydrogen chloride passed in for 11 hours. A clear, dark brown oil weighing 68 g. was isolated as described above. The product obtained was p-cyclohexyl chloromethyl phenoxyethoxyethoxyethyl chloride having the probable formula:

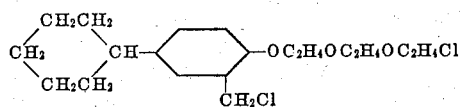

*Example 9*

83.6 grams of p-benzyl phenoxyethoxyethoxyethyl chloride, 81 grams of 37% formaldehyde, and 200 cc. of concentrated hydrochloric acid were heated at 40–50° C. and a stream of dry hydrogen chloride passed in for eight hours. The clear, brown oil, separated as described above, was chloromethyl p-benzyl phenoxyethoxyethoxyethyl chloride.

*Example 10*

A mixture of 136.8 g. of dodecyl methyl phenoxyethoxyethoxyethyl chloride, 60 g. of 37% formaldehyde, and 300 cc. of concentrated hydrochloric acid was heated at 50–60° C. and a stream of dry hydrogen chloride passed in for 27 hours. The red brown oil, isolated as described above, was chloromethyl dodecyl methyl phenoxyethoxyethoxyethyl chloride having the probable formula:

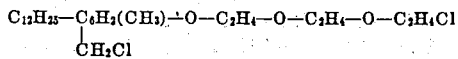

Example 11

A mixture of 156 grams of p-ter-octyl phenoxyethoxyethyl chloride, 30 grams of paraformaldehyde, and 150 grams of ethylene dichloride was stirred while a stream of dry hydrogen chloride was passed in for 17 hours at about 30° C. A red oil layer separated which was washed with cold water, dried with anhydrous sodium sulfate, filtered, and the ethylene dichloride distilled off in vacuo. A clear, brown oil, weighing 137 grams, was obtained. The product was p-ter-octyl-chloromethyl phenoxyethoxyethyl chloride having the probable formula:

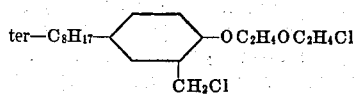

Example 12

A mixture of 178.4 g. of p-ter-octyl phenoxyethoxyethoxyethyl chloride, 41 g. of 37% formaldehyde, 300 cc. of concentrated hydrochloric acid, and 12 g. of powdered anhydrous zinc chloride was stirred and cooled at about 0° C. while a stream of dry hydrogen chloride passed through the mixture for about six hours. This mixture was poured onto ice and the product extracted with benzene. The benzene solution was washed with ice water, dried, filtered, and the solvent removed in vacuo. The clear, pale yellow oil remaining was chloromethyl p-ter-octyl phenoxyethoxyethoxyethyl chloride.

Example 13

A mixture of 32 grams of o-phenyl phenoxy ethanol, 75 g. of 30% formaldehyde, and 90 cc. of concentrated hydrochloric acid was heated at 35-50° C. and a stream of dry hydrogen chloride passed in for seven hours. The product was isolated in the usual manner. It was an oil

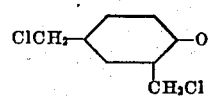

which on analysis was found to be di(chloromethyl) o-phenyl phenoxyethanol.

Example 14

A mixture of 76 grams of phenoxy acetic acid, 90 grams of 37% formaldehyde, and 300 cc. of concentrated hydrochloric acid was heated at 50-60° C. and a stream of dry hydrogen chloride passed in for 6½ hours. A viscous mass separated which was washed and dried on a porous plate. Analysis showed the product to be di(chloromethyl) phenoxyacetic acid.

Example 15

A mixture of 90 g. of phenoxy acetate, 90 g. of 37% formaldehyde, and 300 cc. of concentrated hydrochloric acid was stirred while a stream of dry hydrogen chloride was passed in for 7 hours at 30-40° C. A resinous mass was obtained which was washed and dried on a porous plate. Analysis indicated it to be the dichloromethyl derivative of phenoxy ethyl acetate.

Example 16

A mixture of 46 grams of o-nitro phenoxyethoxyethyl chloride, 41 grams of 37% formaldehyde, and 200 cc. of concentrated hydrochloric acid was stirred while a stream of dry hydrogen chloride passed in at 30-60° C. for about eight hours. A brown oil separated which was purified in the usual manner. The product obtained was chloromethyl o-nitro phenoxyethoxyethyl chloride having the probable formula:

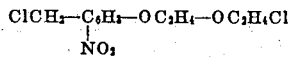

Example 17

A mixture of 80 g. of p-cyclohexyl phenoxyethoxyethyl n-butyl ether, 51 g. of 37% formaldehyde, and 200 cc. of concentrated hydrochloric acid was stirred while a stream of dry hydrogen chloride was passed in at 30-50° C. for seven hours. A clear, yellow oil was obtained which was chloromethyl p-cyclohexyl phenoxyethoxyethyl n-butyl ether having the probable formula:

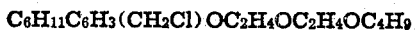

Example 18

A mixture of 156 g. of p-ter-octyl phenoxyethoxyethyl chloride, 30 g. of paraformaldehyde, and 150 g. of petroleum ether (B. P. 30-60° C.) was stirred while a stream of dry hydrogen chloride was passed in for 16 hours at 30-60° C. The turbid brown solution was washed with cold water, dried with anhydrous sodium sulfate, filtered, and the solvent distilled off in vacuo. A brown oil remained which was chloromethyl p-ter-octyl phenoxyethoxyethyl chloride.

Example 19

A mixture of 26 g. of phenoxyethoxyethoxyethyl sulfide, 41 g. of 37% formaldehyde, and 200 cc. of concentrated hydrochloric acid was vigorously stirred while a stream of dry hydrogen chloride was passed in for about 8 hours without heating or cooling. A very viscous layer separated which was washed and dried on a porous plate. The brown elastic mass was tetra(chloromethyl)-phenoxyethoxyethyl sulfide having the probable formula:

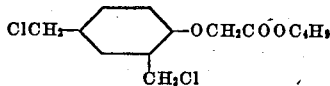

Example 20

A mixture of 104 g. of butyl phenoxy acetate, 90 g. of 37% formaldehyde, and 300 cc. of concentrated hydrochloric acid was stirred while a stream of dry hydrogen chloride was passed in for seven hours without heating or cooling. A yellow layer formed which was dissolved in benzene, washed, dried, and the benzene removed in vacuo. A clear, yellow oil remained which was butyl dichloromethyl phenoxyacetate having the probable formula:

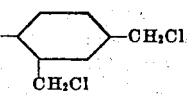

Example 21

A mixture of 87.5 g. of phenoxyethoxyethyl dodecyl ether, 61 g. of 37% formaldehyde, and 200 cc. of concentrated hydrochloric acid was stirred while a stream of dry hydrogen chloride was passed in without heating or cooling for 11 hours. The oil layer which separated was purified as described above. The product was a clear amber oil which was di(chloromethyl)-phenoxy-ethoxyethyl dodecyl ether having the probable formula

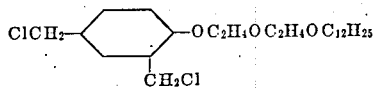

The bromoethyl and di(bromoethyl) derivatives of compounds of the above type may be obtained by replacing the hydrogen chloride with hydrogen bromide. In some cases the aryl polyalkylene ether halides give resinous products which are difficult to isolate. o-Methoxy phenoxyethoxyethyl chloride gives a viscous concentrate analyzing for the dichloromethyl derivative. β-Naphthoxy-ethoxyethyl chloride when treated with formaldehyde and hydrochloric acid yields a resinous chloromethyl derivative.

*Example 22*

A mixture of 53 grams of phenoxy acetone $C_6H_5OCH_2COCH_3$, 50 grams of 37% aqueous formaldehyde, and 300 grams of dioxane was stirred and saturated with gaseous hydrogen chloride at 25–30° C. for eight hours. The reaction mixture was diluted with a large volume of ice water, and the oil layer taken up in benzene, washed, dried, and the solvent removed in vacuo. The product was chloromethyl phenoxy acetone.

*Example 23*

A mixture of 49 g. of phenoxyacetophenone $C_6H_5OCH_2COC_6H_5$, 100 g. of 37% aqueous formaldehyde, and 100 g. of dioxane was stirred and saturated with gaseous hydrogen chloride at 40–55° C. for ten hours. The oil, isolated as in the previous example, was a mixture of trichloromethyl phenoxyacetophenone and dichloromethyl phenoxyacetophenone.

*Example 24*

A mixture of 62 g. of phenoxy acetone $C_6H_5OCH_2COCH_3$, 81 g. of 37% aqueous formaldehyde, and 300 g. of dioxane was stirred and saturated with gaseous hydrogen chloride for eight hours at 10–30° C. The reaction mixture was diluted with ice water, the oil taken up in benzene and washed, dried, and the solvent removed in vacuo. The residual oil was a mixture of 50% of mono- and 50% of di-chloromethyl phenoxy acetone.

This application is a continuation-in-part of application Serial No. 228,145, filed September 2, 1938, now U. S. Patent No. 2,266,737, issued December 23, 1941, in which there are claimed compounds of the formula

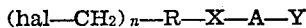

wherein Y is chlorine or bromine. There are claimed herein related compounds in which Y is a —CO-alkyl or —CO-aryl group. The alkyl group may be a short or long chain, a branched or straight chain, such as methyl, ethyl, isopropyl, butyl, isobutyl, heptyl, octyl, iso-octyl, dodecyl, etc. As an aryl group there may be used any of the aromatic groups which have been described above for R, including aryl groups having halomethyl substituents.

We claim:

1. Compounds of the formula:

wherein hal is a member of the group consisting of chlorine and bromine, $n$ is an integer less than three, R is a carbocyclic aromatic radical, X is a member of the class consisting of oxygen and sulfur, A is an alkylene group the chain of which may be interrupted by a member of the class consisting of oxygen and sulfur, and Y is a member of the class consisting of —CO-alkyl and —CO-aryl.

2. Compounds of the formula:

wherein $n$ is an integer less than three, R is a carbocyclic aromatic radical, A is an alkylene group and Y is a member of the class consisting of —CO-alkyl and —CO-aryl.

3. Compounds of the formula:

$(ClCH_2)_n$—R—O—A—Y wherein $n$ is an integer less than three, R is a phenyl radical, A is an alkylene group, and Y is a —CO-alkyl group.

4. Compounds of the formula:

$(ClCH_2)_n$—R—O—A—Y wherein $n$ is an integer less than three, R is a phenyl radical, A is an alkylene group, and Y is a —CO-aryl group.

5. Compounds of the formula:

wherein $n$ is an integer less than three and R and R' are phenyl nuclei.

6. Compounds of the formula:

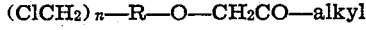

wherein $n$ is an integer less than three and R is a phenyl nucleus.

7. $(ClCH_2)_2C_6H_3OCH_2COC_6H_5$
8. $(ClCH_2)_2C_6H_3OCH_2COCH_3$

HERMAN A. BRUSON.
CLINTON W. MACMULLEN.

CERTIFICATE OF CORRECTION.

Patent No. 2,291,526.

July 28, 1942.

HERMAN A. BRUSON, ET AL.

It is hereby certified that error appears in the printed specification of the above numbered patent requiring correction as follows: Page 1, first column, line 50, for that portion of the formula reading "$CH_8H_{17}$" read --$C_8H_{17}$--; page 3, first column, line 65, after "phenoxy" insert --ethyl--; and second column, line 45, for "phenoxyethoxyethyl" read --phenoxyethoxyethoxyethyl--; page 4, first column, line 8, for "bromoethyl and di(bromoethyl)" read --bromomethyl and di(bromomethyl)--; and that the said Letters Patent should be read with this correction therein that the same may conform to the record of the case in the Patent Office.

Signed and sealed this 22nd day of September, A. D. 1942.

Henry Van Arsdale,
Acting Commissioner of Patents.

(Seal)